United States Patent
Rinne et al.

(10) Patent No.: US 7,596,276 B2
(45) Date of Patent: Sep. 29, 2009

(54) HIERARCHICAL IMAGE MODEL ADAPTATION

(75) Inventors: Michael Rinne, Dortmund (DE); Martin Werner, Hemer (DE); Stefan Gehlen, Bochum (DE)

(73) Assignee: Viisage Technology AG, Bochum (DE)

( * ) Notice: Subject to any disclaimer, the term of this patent is extended or adjusted under 35 U.S.C. 154(b) by 932 days.

(21) Appl. No.: 10/485,452

(22) PCT Filed: Jul. 30, 2002

(86) PCT No.: PCT/EP02/08490

§ 371 (c)(1), (2), (4) Date: Sep. 13, 2004

(87) PCT Pub. No.: WO03/015010

PCT Pub. Date: Feb. 20, 2003

(65) Prior Publication Data

US 2005/0013490 A1    Jan. 20, 2005

(30) Foreign Application Priority Data

Aug. 1, 2001    (EP) .................................. 01118536

(51) Int. Cl.
*G06K 9/68* (2006.01)
*G06F 7/00* (2006.01)

(52) U.S. Cl. .................................... 382/226; 707/104.1

(58) Field of Classification Search ......... 382/224–228; 707/1, 3–6, 104.1
See application file for complete search history.

(56) References Cited

U.S. PATENT DOCUMENTS 4,989,258 A * 1/1991 Takahashi et al. ........... 382/226
5,020,112 A * 5/1991 Chou ........................ 382/226
5,123,057 A * 6/1992 Verly et al. ................. 382/156

(Continued)

FOREIGN PATENT DOCUMENTS

EP    0 528 631 A2    2/1993

(Continued)

OTHER PUBLICATIONS

Marr, et al., "Representation and Recognition of the Spatial Organization of Three-Dimensional Shapes." Proc. R. Soc. Lon. B. Biol. Sci., Feb. 23, 1978, pp. 269-294, vol. 200.

(Continued)

Primary Examiner—Aaron W Carter
(74) Attorney, Agent, or Firm—IP Strategies (57) ABSTRACT

A method of processing digitized picture data includes providing an hierarchical structure graph which is applied to the picture data in that, starting with the lowermost level, at least one node is processed. The provided hierarchical structure graph includes nodes, a specified number of levels, with at least one node located in each level, and edges connecting pairs of predetermined nodes of different levels and defining, for each pair of nodes, a lower father node and an upper son node. Processing of a node includes matching of its at least one picture matching model to the picture data by variation of the model parameters, determination of a matching quantity for each parameter variation, and determination of an assessment for each parameter variation. The assessment found for each parameter variation is applied as a criterion for the processing of a son node of the processed node.

22 Claims, 6 Drawing Sheets

U.S. PATENT DOCUMENTS

| | | | |
|---|---|---|---|
| 6,026,189 A * | 2/2000 | Greenspan | 382/226 |
| 6,625,319 B1 * | 9/2003 | Krishnamachari | 382/238 |
| 7,020,335 B1 * | 3/2006 | Abousleman | 382/199 |
| 7,113,641 B1 * | 9/2006 | Eckes et al. | 382/218 |
| 2001/0033675 A1 * | 10/2001 | Maurer et al. | 382/103 |
| 2002/0083032 A1 * | 6/2002 | Bourges-Sevenier | 707/1 |

FOREIGN PATENT DOCUMENTS

| | | |
|---|---|---|
| EP | 0 567 680 B1 | 11/1993 |
| WO | WO 99/53443 A1 | 10/1999 |

OTHER PUBLICATIONS

"Updating Attributes or Data of Parent Via Changes to the Child." IBM Technical Disclosure Bulletin, May 1985, p. 7066, vol. 27, No. 12.

* cited by examiner

HIERARCHICAL IMAGE MODEL ADAPTATION

FILED OF THE INVENTION

The invention relates to a method of processing pictures by matching of picture matching models, and in particular a method which is suitable for recognising pictures, i.e. recognising individual objects in a picture, for the analysis of scenes, in particular for the recognition and assignment of objects, for the control of system components, e.g. avatars, and for picture compression and decompression.

Here, the expression "picture recognition" is taken to have a wide encompassing meaning. In particular, the term "picture recognition" should include the identification of an object in a picture through the comparison with reference pictures and the classification of objects present in a picture.

BACKGROUND OF THE INVENTION

In digital picture processing a range of methods exist which enable the recognition of individual objects in pictures. One example of this is the so-called "template matching" method which looks for an object using a simple copy of an image of the object.

Another method known from technology is the so-called "graph matching" method which is described in the German patent specification DE 4406020.

A method of automated recognition of one or more structures in digitised picture data is also described in the publication DE 19837004.

A disadvantage of the methods known in technology is that simple matching methods which can be carried out with a comparatively moderate amount of computation are less flexible and soon reach their limits, whereas more powerful and more flexible methods are associated with a very high amount of computation.

BRIEF SUMMARY OF THE INVENTION

Accordingly, the object of this invention is to provide a more efficient method for picture processing which can be used with flexibility with simply structured pictures as well as with complex picture scenes.

This object is solved by the method described in Claim 1.

A method of processing digitised picture data by matching of picture matching models is provided, whereby the method comprises the following steps: (i) provision of a hierarchical structure graph with nodes, which each at least represent a parameterised picture matching model, a specified number of levels arranged above each other, whereby at least one node is present in each level, edges which link pairs of predetermined nodes of different levels and, for each pair of nodes, a father node is defined as the node in the lower level and a son node as the node in the upper level; (ii) application of the structure graph to the picture data, in which, starting with the lowermost level, at least one node is processed, whereby the processing of a node includes the steps: matching of its at least one picture matching model to the picture data by variation of the model parameters, determination of a degree of matching for each parameter variation as a measure for the quality of the picture matching and determination of an assessment for each parameter variation, taking into consideration the at least one determined matching measure, and whereby the assessment determined for each parameter variation is used as the criterion for the processing of a son node of the processed node and, if the criterion is fulfilled, the processing of the son node with the initialisation of its at least one matching model through predetermined parameters of the father node.

A structure graph therefore consists of a quantity of nodes which represent picture matching models and their associated picture matching methods and edges, which each define a pair of father/son nodes and in each case a processing sequence for it.

A significant advantage of the method according to the invention is that, due to the application of a suitably provided structure graph, the method according to the invention enables an efficient combination of highly different picture matching models and associated methods for the processing of digitised picture data. This means that simple picture matching models may be used on the lower levels of the structure graph, enabling initial conclusions to be drawn about the position of objects in the pictures corresponding to the picture data. To this end, methods may be applied which require a comparatively low amount of computation, such as, for example, simple differential imaging methods. Other methods are, for example, based on the assessment of the shape and geometry and the relationship of objects to one another, on colour classifications, template matching, Hough transformations, methods of segmentation (e.g. region-growing approaches), the use of stereo information (e.g. disparity estimation), the extraction and description of textures or the application of neuronal methods for the classification of picture regions.

The matching of a picture matching model occurs through the variation of the parameters of the picture matching model. These parameters include, for example, translation (position), scaling and rotation (orientation) in the picture level, but also local changes in the models.

A rule is also assigned to each picture matching model with which a measure for the quality of the matching of the picture matching model to the picture data to be processed may be determined.

It must be noted that the application of the father/son relationship is only used for the clarification of the processing sequence, but is generally not unambiguous, because not only may each father node possess a number of son nodes, but also each son node may possess a number of father nodes in the structure graph.

With a development of the method according to the invention particularly preferred for the recognition of objects, a structure graph is provided which includes exactly one node in each level, whereby the node represents at least one picture matching model and a lower threshold value and/or an upper threshold value is assigned to specified nodes. In this development the method terminates with the result that no object of the specified object class is recognised if, for a node, the assessment for each parameter variation lies below a lower threshold value assigned to the node, or that at least one object of the specified object class is recognised if, for a node, the assessment of at least one parameter variation lies above the upper threshold value assigned to the node or if the end node is reached.

This development may be applied particularly advantageously in the identification of persons. In comparison to conventional methods it may be operated significantly faster because more efficient evaluation of the picture data may be carried out in that the evaluation starts on a coarse scale on the lowermost level of the structure graph and the parameters found are used for the evaluation of details on higher hierarchical levels, e.g. as initial values for the relevant matching processes.

With another development of the method according to the invention the structure graph, for various orientations and/or arrangements of elements of an object, exhibits at least one node with at least one picture matching model for the orientation to be recognised and specified nodes exhibit an upper and/or lower threshold value for the assessment of the parameter variations. The implementation of the method occurs such that the processing of son nodes of those nodes processed is waived, for which the assessment of each parameter variation lies below the lower threshold value assigned to the relevant node, with the result that the corresponding orientations and/or arrangements of the elements of the object are not present in the picture; that son nodes are processed of those processed nodes for which the assessment for at least one parameter variation lies between the upper and lower assigned threshold values of the relevant node; and that the processing of son nodes is waived for the parameter variations, the assessment of which lies above the assigned upper threshold value of the relevant node, with the result that the orientation and/or arrangement of the elements of the object is classified as present in the picture which receives the best assessment on the highest fully processed level.

This further development is especially advantageous in the recognition of the orientation of an object of an object class in a picture. In particular, this further development may be employed advantageously in estimating poses and differentiating between different poses.

An alternative advantageous further development of the method according to the invention enables the recognition of objects of different object classes and of the arrangement of objects in a picture and may consequently be advantageously employed in scene analysis. Here, the structure graph for each object class comprises at least one node with at least one picture matching model for the object class, whereby specified nodes exhibit a lower and/or upper threshold value for the assessment of the parameter variations. With this further development the processing of son nodes is waived for those nodes for which the assessment of each parameter variation lies below the lower threshold value defined for the relevant node with the result that the associated object is classified as not being present in the picture; son nodes of those processed nodes are processed for which the assessment lies between the lower and upper threshold values for the relevant node for at least one parameter variation; and the processing of son nodes for the parameter variations is waived, the assessment of which lies above the upper threshold value assigned to the relevant node with the result that the associated object is classified as being present in the picture.

A structure graph suitable for a scene analysis is generally a complex formation, whereby for one end node (i.e. a node on the uppermost level of the structure graph) there are typically a number of paths, whereby the term "path" designates a sequence of nodes having a father/son relationship.

This means that there are nodes in the graph which possess more than one father node. This enables single objects to be reused as parts of other complex objects. Consequently, this produces not just a meagre representation of knowledge about objects in structure graphs, but rather the evaluation process profits from it, because the same object parts are no longer in competition with one another in different contexts.

In order to generate a description of a complex scene, a structure graph is used, the paths of which terminate at end nodes, the picture matching models of which represent different types of objects. The lowermost layers in the structure graph contain picture matching models which differentiate between the objects according to size, orientation and coarse structure. In the following layers the objects are subdivided into different classes in order to finally differentiate according to all or a large part of their definite features at the end nodes.

The evaluation process first processes the picture matching models of the lowermost layer using the method assigned to it. Here, the rough positions of the objects are determined. With the decision for a parameter variation of the picture matching models of a node, the method favours initially objects of the corresponding object class with the features defined by the parameter variation. Further evaluation occurs in the next stage with the processing of the picture matching models of the son nodes of the processed node with the best assessment for a parameter variation when the assessment lies above a specified lower and below a specified upper threshold for the node. With this processing stage part of the parameters is used to define the initial values, in particular the position, for the picture matching models and to restrict the possible variations of the parameters of these picture matching models.

The result of the evaluation is a set of parameter variations which belong to objects recognised in the picture. Here, the parameters determine the position and other properties of the picture matching models, such as for example the size.

In a further, particularly advantageous development of the method according to the invention a lower threshold value is assigned to each node of the structure graph and the processing of son nodes of a node is waived if each parameter variation produces an assessment below the threshold value defined for the node.

This means that a few matching stages which look promising are prematurely interrupted, leading to faster execution of the method. If the models employed permit it, the matching dimensions and the assessments are defined such that the assessments of different nodes may be directly compared with one another. In this case in the latter mentioned further development a universal threshold value may be specified for all nodes.

In a preferred further development of the method according to the invention the lower and/or the upper threshold values may be adapted dynamically.

Consequently, the thresholds, for example, due to results for a preceding picture in a sequence may be modified to express a certain expectation regarding the chronological course of the picture sequence, in particular the recognition of the object already detected, in the next picture.

Particularly advantageously, parameters of the processed father nodes may be accepted at least partially in the method according to the invention for the processing of son nodes.

For example, on a lower level of the structure graph the outline of an object may be determined whereupon the corresponding parameters are accepted into the models of the son nodes. The term "accepted" may signify that the parameter values directly enter a matching model without being newly released there for variation, but also that they act as initial values of the matching model or the initial values are calculated from them. The parameters of the father nodes may also be advantageously applied in that they define limits in which appropriate parameters of the picture matching models of the son nodes may be varied. In all of these cases the amount of computation is substantially reduced and, of course, most significantly in the first case.

In an advantageous further development the appropriate assessment of the parameter variations for picture matching models of the father node is taken into account in the assessment of the parameter variations for picture matching models of son nodes. This is particularly of advantage when at the highest processed level in each case different matching processes lead to closely adjacent assessments, involving the risk that, on continuing, the method runs to a sub-optimum solution which does not correspond to the best possible result.

In a further development of the method according to the invention weighting values, which enter into the assessment, are assigned to each picture matching model and/or each edge.

The weighting of the picture matching models and/or of the edges may be practicable when a certain expectation of a picture to be processed is present, and/or when a node encompasses several picture matching models which have different informatory values. When a node exhibits a number of son nodes, the weighting of the edges may also be applied to specify a processing sequence of the son nodes, which, with a suitable selection of threshold values (interruption criteria), may help to avoid a superfluous amount of computation. Also, combinations which offer more information or are more plausible of different nodes may reasonably be taken into account, because these weighting factors may act as a predetermined measure of which combination of picture matching models of nodes on different levels is attributed a particularly high level of informatory value.

With a particularly preferred further development of all previously mentioned methods, the picture matching models of the nodes of the uppermost level are based on digitised reference picture data and/or the picture matching models of predetermined nodes are based on the picture matching models of their son nodes.

This means that in a simple manner a hierarchy in the complexity of the picture matching models may be achieved, whereby for example the picture matching models of the end nodes correspond to detailed portraits, whereas picture matching models are built up more simply, i.e. for example, they exhibit fewer parameters the deeper the level is located. Such simplified picture matching models may be quickly adapted, whereby a quick and effective evaluation is ensured in the lower levels, which in turn has a positive effect on the overall efficiency of the method.

With particular preference, the picture matching models of the nodes of the structure graph encompass graphs of features, so-called model graphs, which consist of a two-dimensional arrangement of model graph nodes and edges. Here, features which contain information about picture data are assigned to the model graph nodes. The model graph edges code the relative arrangement of the model graph nodes.

Particularly preferred model graphs are so-called reference graphs, the features of which are the results of the application of a set of filters, e.g. Gabor filters, on the digitised data of comparative pictures. Here, the features may be the results of the application of a set of filters to picture data which itself may originate from different comparative pictures.

The set of filters may be obtained using scaling and rotation from an original filter. The scaling of the filters, from which the features are obtained, is preferably smaller from hierarchical stage to hierarchical stage, whereby the frequency increases or the resolution becomes more refined. These types of feature are termed jets.

With the matching of the picture matching model graphs the similarity of the jets of each picture matching model graph node k is calculated with the corresponding jets of the current picture. In addition, a number of features m, which may be generated from different pictures or a previous learning process for the picture matching model features, may be assigned to each picture matching model graph node. For each picture matching model graph node the similarity of its jet to the jet from the current picture is calculated for a certain position. In this respect, the jets of each reference graph $j(k,m)$ are compared to the jets from the current picture $\tilde{j}(k)$.

In the most general case a descriptive measure of matching is produced for the parameter variations of the picture matching models for the overall similarity between the picture matching model graph and the picture according to the formula:

$$S^{(n)} = f^{(n)}(P_k^{(n)}\underline{j}(k,m), P_k^{(n)}\underline{\tilde{j}}(k), \underline{d}^{(0)}(k,m), \underline{d}^{(n)}(k,m)), k \in K'(n) \subseteq K,$$

whereby $\underline{j}(k,m)$ is the jet of the picture matching model m on the node k, $\underline{\tilde{j}}(k)$ is the jet of the picture on the position of the node k, $\underline{d}^{(0)}(k,m)$ is the original position of the node k of the picture matching model m, $\underline{d}^{(n)}(k,m)$ is the position of the node k of the picture matching model m in step n, $f^{(n)}(\ldots)$ is a functional of the picture matching model jet and the picture jet at corresponding locations, $P_k^{(n)}$ represents an image of the jet $\underline{j}(k,m)$ or $\underline{\tilde{j}}(k)$, and $K'(n)$ is a subset of the set K of all graph nodes k.

The original position and its change is used for the computation of the topological costs incurred by too strong a deformation of the picture matching model. The step parameter n here indicates that the computation of the overall similarity varies both during the individual phases of the matching process for a picture matching model and also for picture matching model to picture matching model. In particular, the matching process is subdivided into a number of phases, such as for example the coarse positioning, rescaling and fine matching of the picture matching model. In each phase the overall similarity is calculated in an adequate manner.

In a preferred form the similarity of the graph is chosen in step n as:

$$S^{(n)} = f_2^{(n)}(k, f_1^{(n)}(n, s(P_k^{(n)}\underline{j}(k,m), P_k^{(n)}\underline{\tilde{j}}(k)), \underline{d}^{(0)}(k,m), \underline{d}^{(n)}(k,m)))$$

Here $f_1^{(n)}(n, s(P_k^{(n)}\underline{j}(k,m), P_k^{(n)}\underline{\tilde{j}}(k)), \underline{d}^{(0)}(k,m), \underline{d}^{(n)}(k,m))$ is the similarity of the picture jet to the picture matching model jets or the submodel jets for step n.

Via $f_2^{(n)}(k, \ldots)$ an overall measure is obtained over all nodes. In this connection topological costs may in particular be taken into account. These form a measure of the local deformation of the model graph which arises during the matching through the displacement of the model graph nodes with respect to one another.

In further preferred forms a summation, weighted summation or mean formation is chosen both for $f_1$ as well as for $f_2$. (With $f_1$ as the sum over the picture matching models or picture matching model subjets, with $f_2$ as the sum over the nodes.)

In other constellations it has also proven to be advantageous to use an ordering operation such as the median or the "trimmed mean" for $f_1$ or $f_2$.

In a particularly preferred form the jet similarity of the graph may be chosen in step n as:

$$S^{(n)} = \sum_{k \in K'(n)} l_m^{th}(n) s(P_k^{(n)} \underline{j}(k,m), P_k^{(n)} \underline{\tilde{j}}(k)) + f^{(n)}(\underline{d}^{(0)}(k,m), \underline{d}^{(n)}(k,m))$$

Here $l_m^{th}(n)$ designates an ordering operation on the m jet similarities $s(P^{(n)}\underline{j}(k,m), P^{(n)}\underline{\tilde{j}}(k))$, e.g. with l=1 the maximum of the m similarities.

The changes in the topology of the picture matching models are taken into account with $f^{(n)}(\underline{d}^{(0)}(k,m), \underline{d}^{(n)}(k,m))$.

In a further indicated form $P^{(n)}$ is a function of jets which transforms the vector j into a vector j', whereby the components of j' are a subset of the components of j. This function may however vary over the nodes. This is particularly of benefit if the approximate position of the model on the picture region is to be found through the selection of the low frequency portions on a node, while at the same time high frequency portions are used on other significant nodes to increase the sensitivity of the localisation and detection resolution.

If the jets are represented in the form of amplitudes ($a_i$) and phases ($p_i$), then the feature similarity $s(\underline{j},\underline{\tilde{j}})$ may be calculated in preferred embodiments according to one of the following formulas:

$$s(\underline{j},\underline{\tilde{j}}) = \frac{\sum_i a_i(m)\tilde{a}_i}{\sqrt{\sum_i a_i(m)a_i(m)\sum_i \tilde{a}_i\tilde{a}_i}}$$

$$s(\underline{j},\underline{\tilde{j}}) = \frac{\sum_i a_i(m)\tilde{a}_i \cos(p_i(m) - \tilde{p}_i)}{\sqrt{\sum_i a_i(m)a_i(m)\sum_i \tilde{a}_i\tilde{a}_i}}$$

$$s(\underline{j},\underline{\tilde{j}}) = \frac{\sum_i a_i(m)\tilde{a}_i \cos(p_i(m) - \tilde{p}_i - \underline{d}\underline{k}_i)}{\sqrt{\sum_i a_i(m)a_i(m)\sum_i \tilde{a}_i\tilde{a}_i}}.$$

In the last formula $\underline{d}$ designates the disparity between the model and picture jets. To determine s, $\underline{d}$ is varied such that s is a maximum. $\underline{k}$ designates here the position of the i-th filter in the Fourier space.

In a further preferred form, the vectors on the nodes may not just represent jets in the conventional sense, which are based on a Gabor transformation, but rather also so-called compound jets, the components of which also represent non-homogeneous representations of a region, e.g. edge information in a component and similarity to a colour in another.

Furthermore the combination of a number of these methods (i.e. of the picture matching model associated with the methods) within a node of the structure graph is practicable, because the results of the individual methods in the computation of an overall assessment (i.e. quality of matching) for the node permits a more exact assessment of the picture data used as a basis than would be the case with each method taken alone.

A special form of the method described here is the bunch graph matching which may be represented as:

$$S = \sum_{k \in K} \max_m \; s(\underline{j}(k,m), \underline{\tilde{j}}(k))$$

In a possible embodiment the picture matching models on the nodes each possess a set of the same features, so-called bundled jets. This bundle generally represents a special aspect of an object as a set of features obtained from a set of individual characteristics. If such a picture matching model represents a face, then the right eye, left eye, mouth and nose are special aspects. They are each represented by a set of features obtained from the corresponding aspects of a set of comparative pictures, which each show the face of another person with possibly another facial expression.

The number of features needed to cover a representative part of the different characteristics and therefore to obtain a sufficiently general representation of the aspect varies. This is on one hand the case from node to node of the picture matching model, because the object generally has simple aspects which are very similar for all individuals, and at the same time has other more complex aspects which differ significantly from individual to individual.

With the application of filters of different sizes the dependence of the resolution is also included. Consequently, generally a few representatives are sufficient for the features obtained from the coarse filters, whereas the same aspects for the features of the fine resolving filters vary more significantly and therefore more features of different individuals are needed in order to achieve the same general validity of the representation than is the case for the coarsely resolving filters and their features. The number of features in the bundles of the picture matching model nodes reduces accordingly when the resolution of the filters is reduced from the end nodes towards the start node.

The classical representation with only one picture matching model cannot profit from this fact, because the features include all filters from coarse to fine resolution.

Preferably the structure graph is set up such that the features include combinations of different types of jets. With regard to the evaluation of the structure graph, it is practicable if the individuals, from which the features are obtained and which contribute to the optimum matching of a picture matching model on a level, change from level to level.

This enables a very compact representation through the structure graph, because with the classical graph matching, features are always needed which contain all the applied filters with their various resolutions. In this respect a bundle would need in each case to contain an appropriate feature for all possible combinations of the features for the individual resolutions in order to achieve the same generality as the described representation via the structure graph. Apart from the management of the very large number of features, which are needed according to the laws on combination theory, the procurement of the data for all these individuals renders this approach very cumbersome, if not unusable.

The described method is very suitable in a further development for picture compression and decompression.

Picture compression comprises the steps: compression of each recognised object with a given compression factor for the appropriate object class, whereby the control of the parameters of the compression method is based on the parameters from the results of the scene analysis and compression of the picture region (background) not occupied by objects using a higher given compression factor.

During the compression the picture is segmented into single objects according to the above described scene analysis. These objects have here already been broken down into their constituent parts by the picture matching model along the associated path in the structure graph. The information from the segmentation and the breaking down of the objects may be used for the compression in many ways:

Through the control of the parameters of a conventional compression method, it is ensured that the "interesting" objects may be reproduced with good quality after the decompression, whereas the "uninteresting" regions of the picture are more substantially compressed, whereby the losses in quality resulting from this are not a disturbance in the reproduction.

If the structure graph is available during the decompression, then an identifier for the path in the structure graph which has been found for an object may be transferred. During the decompression a type of phantom object may then be generated based on the knowledge via the path in the structure graph. In addition, the information may be coded which enables the phantom object to adapt to the actual object. In this way only a very compact code for the object class (the path in the structure graph) and the information about the variation of the actual object compared to its class representative need to be transferred.

Instead of retaining the complete structure graph for the decompression, the relevant part may be initially coded. During the compression of picture sequences, the part of the structure graph needed for an object only needs to be transferred once and then the appropriate part may be coded again by a short identifier.

The picture decompression of this sort of compressed picture occurs by the reverse of the procedure used for the compression.

As already described under picture compression/decompression, the information obtained about the picture content may also be used in order to replace the actual objects in the picture by the representatives of their object class.

The preferred development of the appropriate method includes the steps: provision of reference pictures of the object representatives, substitution of the at least one selected recognised object by the object representative, whereby part of the parameters of the picture matching models may be applied to the control of the object representatives.

This technique may also be applied to use any placeholders, so-called avatars, instead of the representatives. These avatars may be controlled through the processing of picture sequences and the tracking of objects which it produces and their intrinsic movements. This technique is used in video telephony, 3D internet chat, in trick-film techniques and in the control of virtual figures of interactive software, such as for example a game or a virtual museum.

Similarly, advantageous further developments of the method according to the invention may be used to replace the background in a picture by a different background in that at least one reference picture is provided for the other background and then at least one object recognised by the method according to the invention is inserted into the reference picture.

Here, combinations of the latter mentioned methods are also possible so that—starting from a real picture with object(s) and background—an artificial picture is created, whereby at least one of these objects is replaced by an object representative and the background by a different background.

In order to be able to visualise such pictures more easily without in each case having to process, save or transfer the entire information, a preferred further development of the method according to the invention makes available a data base with the object representatives and/or the reference pictures for the background. In particular for the transfer of such processed pictures, it proves useful if the data base is also made available on the receiver side.

In particular, a further development is suitable for all types of trick-film techniques, in which the object representatives include real objects and/or virtual objects.

This enables almost any desired scenes to be composed.

A particularly advantageous further development of the method according to the invention may be used for processing the individual pictures of a picture sequence. To do this, the parameters of the picture matching models are allocated initial values which use part of the parameters from the processing of previous pictures.

In comparison to the processing of individual pictures carried out independently from one another, a substantial speeding up of the processing procedure may be achieved in this way.

Preferably, the possible variations of the parameters of the picture matching models based on a part of the parameters from the processing of previous pictures are restricted, because in this way the number of the computation operations to be carried out may be further restricted. This is mainly practicable when chronologically sequential pictures of a picture scene which changes relatively little are to be processed.

In the following particular embodiments of the invention are explained with reference to the accompanying figures, in which:

BRIEF DESCRIPTION OF THE DRAWINGS

FIG. 2: shows a preferred method of estimating a pose,
FIGS. 3A/3B: show picture matching models used for a picture analysis on different hierarchical levels,
FIGS. 4A/4B: show a picture analysis carried out with the picture matching models illustrated in FIGS. 3A/3B.

DETAILED DESCRIPTION OF THE INVENTION

Object Recognition

In this embodiment the structure graph consists of a chain of nodes, each of which is connected by aligned edges.

The object of the evaluation process here is the efficient selection of suitable parameters for all picture matching models in the structure graph. This includes in particular the position of the object in the picture.

In a particularly effective embodiment the picture matching models of the nodes represent picture information, the degree of detail of which increases from level to level in the direction of the end node. The degree of detail may here vary both in the complexity of the picture matching model and/or in the resolution of the representation of the picture data.

In order, for example, to be able to recognise a person in a picture completely with body, head, arms and legs, a structure graph is provided which in the node on the lowermost level exhibits a very simple picture matching model which has just sufficient information about the picture data to acquire the rough alignment of a person as a whole. At the next higher levels the corresponding picture matching model encompasses increasingly more details and the applied representation of the picture data enables these still relatively coarse structures to be recognised if they are present in the picture to be examined.

The evaluation process starts on the node of the lowest level whose picture matching model is matched to the picture data, whereby the parameters of the picture matching model, in particular the parameters for the positioning of the model, are varied until the best possible (or at least a sufficiently good) match, i.e. exceeding a given threshold value, is achieved with the current picture data. The resulting parameter set describes the rough alignment of the person in the picture.

With the transition to the son node of the processed node, the associated picture matching model is preassigned with suitable parameters (parameter initialisation), whereby the parameter values resulting from the variation methods carried out for the processed node are taken into account. This includes particularly the definition of the position and the choice of a suitable variation range for the position.

The matching process refines the position of the object and determines suitable parameters for the additional degrees of freedom which highlight this picture matching model from the previous one. The same procedure is used with the other nodes on the path to the end node and for the end node itself.

At the end of the evaluation process all nodes of the chain are processed and the picture matching model assigned to them matched to the picture data. Here, the complete information about the object, such as for example the position and type of individual parts, may be distributed over the whole of the picture matching models and their parameter assignments.

Figure 1:
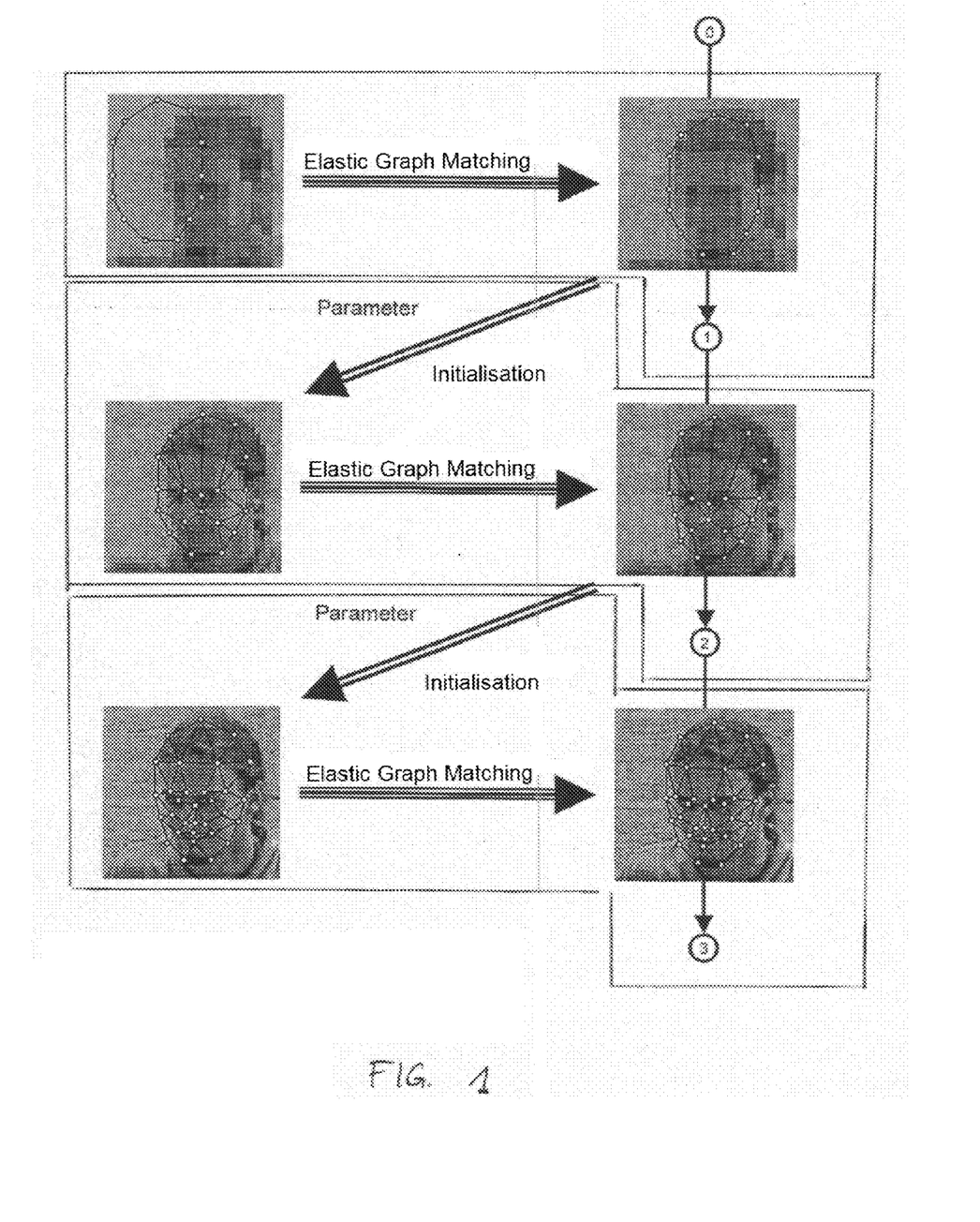
FIG. 1: shows a preferred method of object recognition.

FIG. 1 clearly shows a preferred embodiment of the method according to the invention for object recognition.

The reference symbols 1, 2, 3 stand for the nodes of the structure graph which consists of a simple chain of three nodes in this example. The "node" 0 is not part of the actual structure graph, but instead stands symbolically for the initialisation of the method procedure.

Since with this simple embodiment, one node and the associated level may be identified together, the same reference symbols are used for the node and associated level.

For reasons of better clarity, the picture matching models and stages corresponding to a node in the drawing level are illustrated in each case above the symbol representing the node.

This means that node 1 is processed in step 0→1 and correspondingly node 2 in step 1→2 and node 3 in step 2→3.

The left partial picture shows here in each case the matching model before the matching process and the right partial picture shows the matching model after the matching process.

The left partial picture of the first level 1 has been initialised with any parameters. In contrast, the corresponding left partial pictures on levels 2 and 3 have been initialised with the parameters in each case of the right partial picture of the upper adjacent level.

It must be noted that in FIG. 1—as also in the corresponding following figures—the hierarchical stages increase from the top to the bottom.

The evaluation method begins with node 1: The picture matching model of this node is a very coarse model of faces which essentially represents the outline of the face. The picture information is also represented very coarsely, e.g. with low-frequency filters for only two different directions. During the matching process, this model is evaluated at all possible picture points or an adequately selected subset, for example by sampling down, before the best parameter variation for the processing of the following levels is applied. Due to the coarse view of the picture, the matching process is carried out on a coarse pitch so that only relatively few possibilities need to be evaluated. The assessment of the individual possibilities also occurs very fast, because the picture information is represented with only a few filters.

Once the matching process on the lowermost level is concluded, the model of node 2 is initialised based on the results of the father node 1. Here, in particular the localisation of the model is accepted, i.e. the parameters of node 1 describing the positioning are taken into account for its son node 2.

The matching process of the matching model of node 2 only operates on a small picture extract and essentially carries out local optimisations of the results of the first level. With this optimisation the now additional available information of the refined model and the more accurate representation of the picture is exploited through more and better resolved filters.

After the matching of this model the model of node 3 is accordingly initialised. The relatively complicated matching of this model now occurs only within a very restricted search space and is therefore quickly concluded.

The advantages of the method compared to the conventional graph matching and its variants lie in the refined control of the overall matching process due to the structure graphs.

The situation is avoided where detailed model and picture information must be taken into account for matching the coarse structure; at this stage they would not contribute to any relevant gain of information, but would drastically increase the amount of computation. Through application of the structure graph, details are only taken into account (at higher hierarchical levels of the structure graphs) when this is practicable.

With conventional (classical) graph matching, the consistent application of detailed picture information and complex models also often leads to suboptimum solutions. This disadvantage can also be avoided by the method according to the invention by applying the structure graphs.

Pose Estimation

Figure 2:
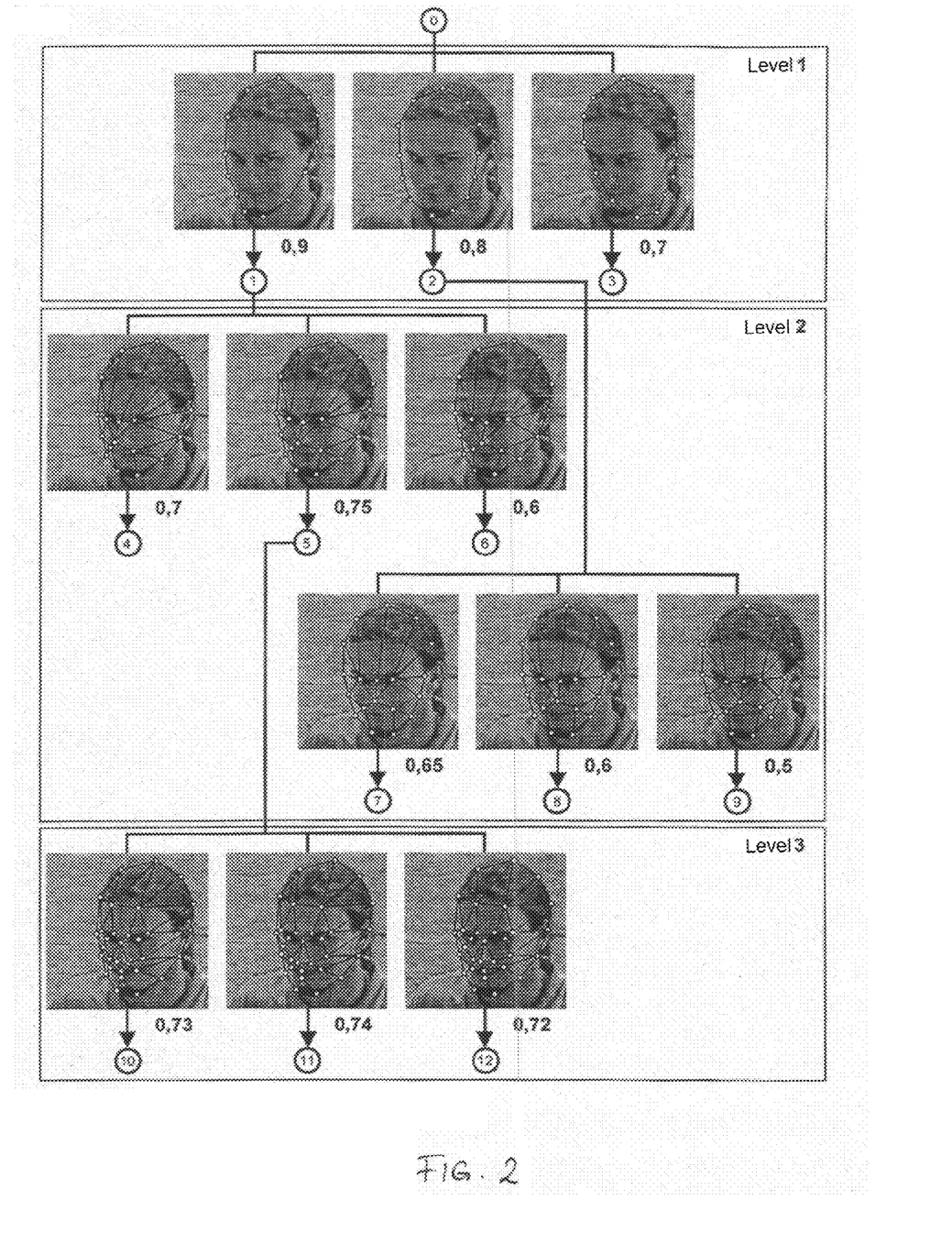

FIG. 2 shows an embodiment of the method according to the invention which may in particular be used for pose estimation.

With this embodiment the associated structure graph exhibits a similarity to a tree with branches.

For each parameter variation an assessment is computed which arises from the matching dimensions of the picture matching models of a node and the weightings assigned to them.

The evaluation process is continued with the son nodes of the node for which the best assessment of a parameter variation has been attained. The picture matching models of the son nodes of this node are preassigned with suitable parameters. This particularly includes the positioning of the picture matching model in the current picture.

All previously assessed parameter variations are in competition. Therefore the evaluation may be continued at a node different from one of the son nodes of the currently considered node. This always takes place when the assessments for all parameter variations of the currently considered node are worse than a previously assessed parameter variation. This procedure enables the structure graph to be evaluated without having to make a decision prematurely which would then possibly lead to a worse or even incorrect result.

As already seen with the first example (FIG. 1), the "start node" 0 is not an integral constituent part of the structure graph, but rather is only used for the initialisation of the method. Using this node, it may be specified, for example, in which sequence the nodes 1, 2, 3 of the lowermost level of the structure graph are to be processed.

In the structure graph a subdivision into simple structures occurs on the lowermost level 1. With increasing hierarchical stages the structures become more and more complex until they possess the full complexity for the representation of complete objects at the end nodes, the nodes of level 3.

In order to be able to recognise the head of a person in the picture in a wide spectrum of different poses or head postures, a structure graph is formed in which the picture matching models in the lowermost level 1 only represent the coarse head shape from rounded to elongated and coarse orientation in the plane of the picture.

The models of the next (second lowest in the hierarchy) level 2 represent the head shape and a coarse form of the inner structure of faces, such as for example the position of the eye recesses and the mouth region.

Level 3 is the uppermost level of the structure graph and exhibits end nodes, the models of which encompass the complete representation of the faces in various poses.

Matching of the models of the nodes of the lowest level occurs as described in the last example and supplies the assessments given in the picture, whereby in each case only the assessment for the best parameter variation is given. They are the assessment 0.9 for the node 1 processed in step 0→1, assessment 0.8 for the node 2 processed in step 0→2 and the assessment 0.7 for the node 3 processed in step 0→3.

Based on these assessments the son nodes of node 1, situated on the second level of the structure graph, are now processed first, whereby their picture matching models are initialised based on the results of the matching process for node 1.

After processing the son nodes 4, 5, 6 of node 1, the assessments of 0.7 for node 4, 0.75 for node 5 and 0.6 for node 6 result.

These assessments are however worse than the assessment of the node processed on the first level in step 0→2, the assessment of which is 0.8.

Further evaluation of the paths starting with step 0→1 is therefore initially withdrawn and first the possible promising processing of the son nodes of node 2 processed in step 0→2 is carried out.

In this respect, the models of the son nodes based on the matching of the model of node 2 processed in step 0→2 are initialised and then the matching method is again carried out.

For nodes 7, 8, 9 the matching leads to the assessments 0.65, 0.6 and 0.5 given in the picture. Therefore, the best assessment of the son nodes 7, 8, 9 of the node 2 lies below the best assessment of a son node of node 1 processed in step 0→1.

Consequently, processing of the son nodes of the best assessed node 5 of the second level now proceeds. These are the nodes 10-12.

The matching of the associated models supplies the best assessment for node 11 which with 0.74 is also higher than the best assessment of nodes 7-9 of the hierarchical level 2 situated below.

The evaluation of the structure graph can therefore be concluded.

Scene Analysis

Since scenes may have any degree of complexity, a structure graph which may be used for scene analysis is generally a very complex formation, whereby there are typically many paths to the end nodes. This means that there may be nodes in the graph which possess more than one father node. This enables single objects to be reused as parts of other complex objects. Consequently, it is not just a meagre representation of the knowledge about objects in structure graphs which arises, but rather the evaluation process profits from it, because the same object parts no longer compete with one another in different contexts.

This type of scene analysis is now described in the following with reference to FIGS. 3A, 3B and 4A, 4B.

In order to generate a description of a complex scene, a structure graph is used whose paths end at end nodes whose models represent different types of objects.

The lowermost level of such a structure graph contains models which differentiate the objects according to size, orientation and coarse structure. In the higher levels the objects are subdivided into various object classes so that at the end nodes differentiation may take place according to all or a large part of their established characteristics.

Figure 3A:
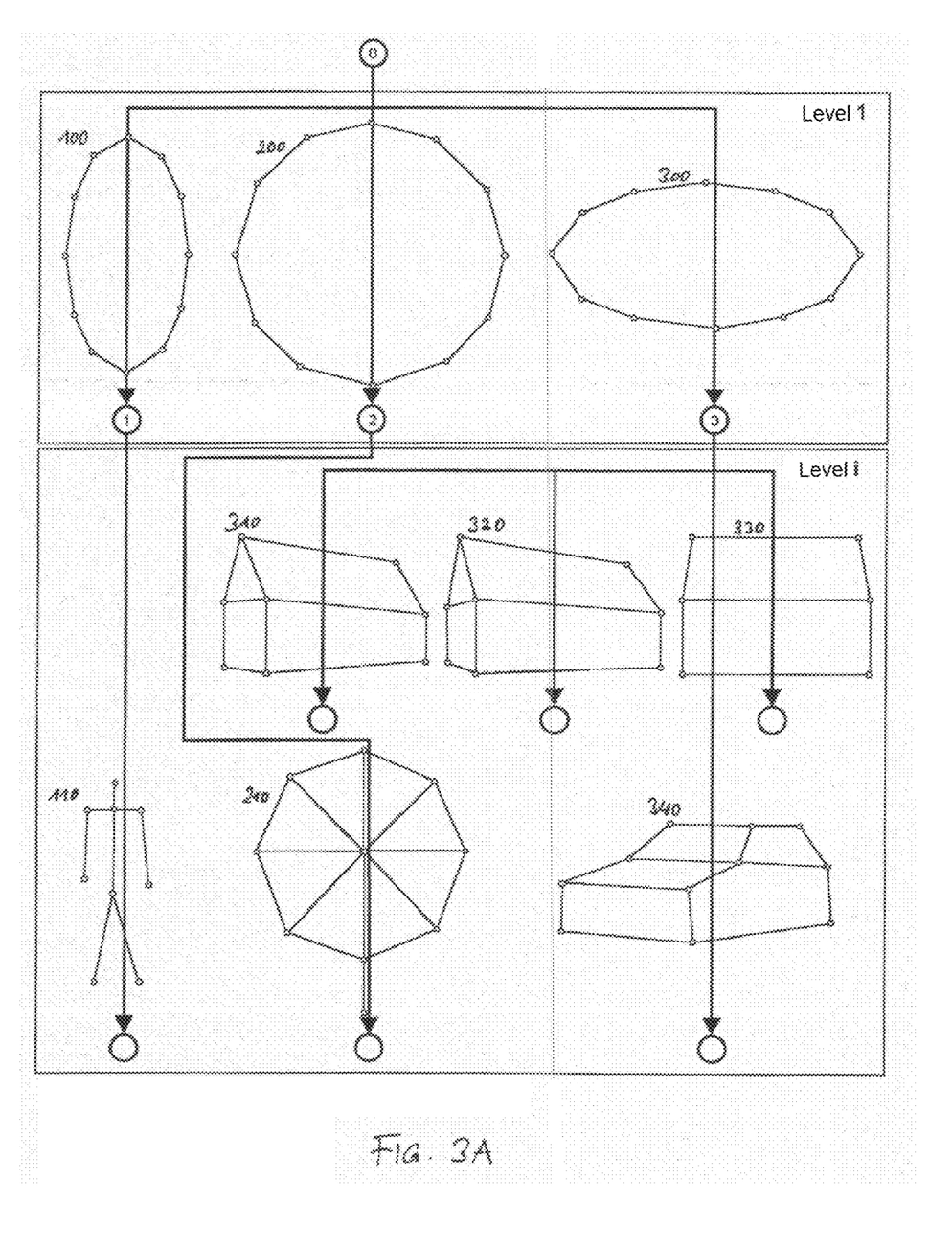
Figure 3B:
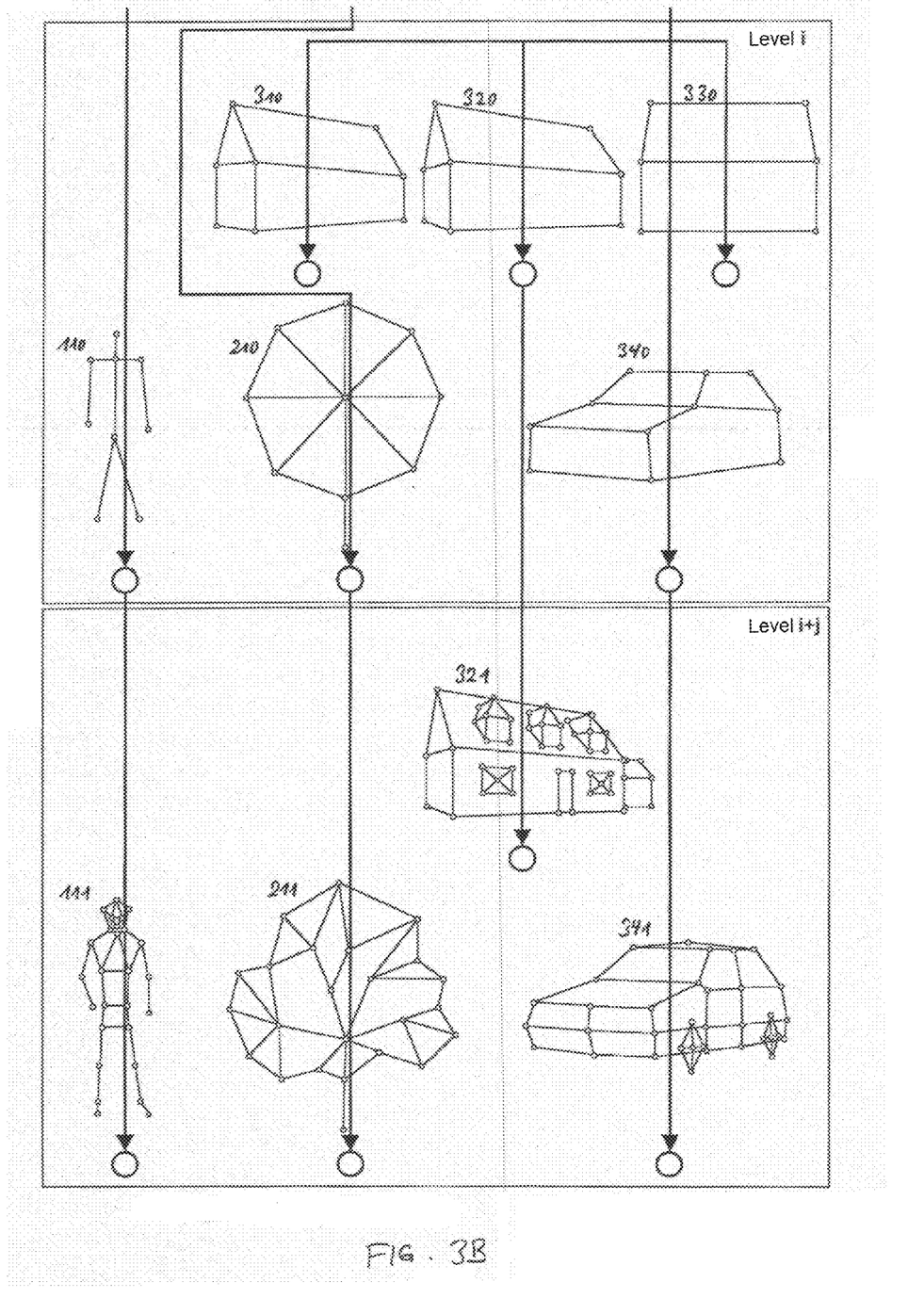

FIGS. 3A/3B illustrate picture matching models 100, 200, 300; 110; 210, 310, 320, 330, 340; 111, 211, 321, 341 used for a picture analysis on three different hierarchical levels 1; ... ; i ... ; i+j, ... (1<i<i+j).

Figure 4A:
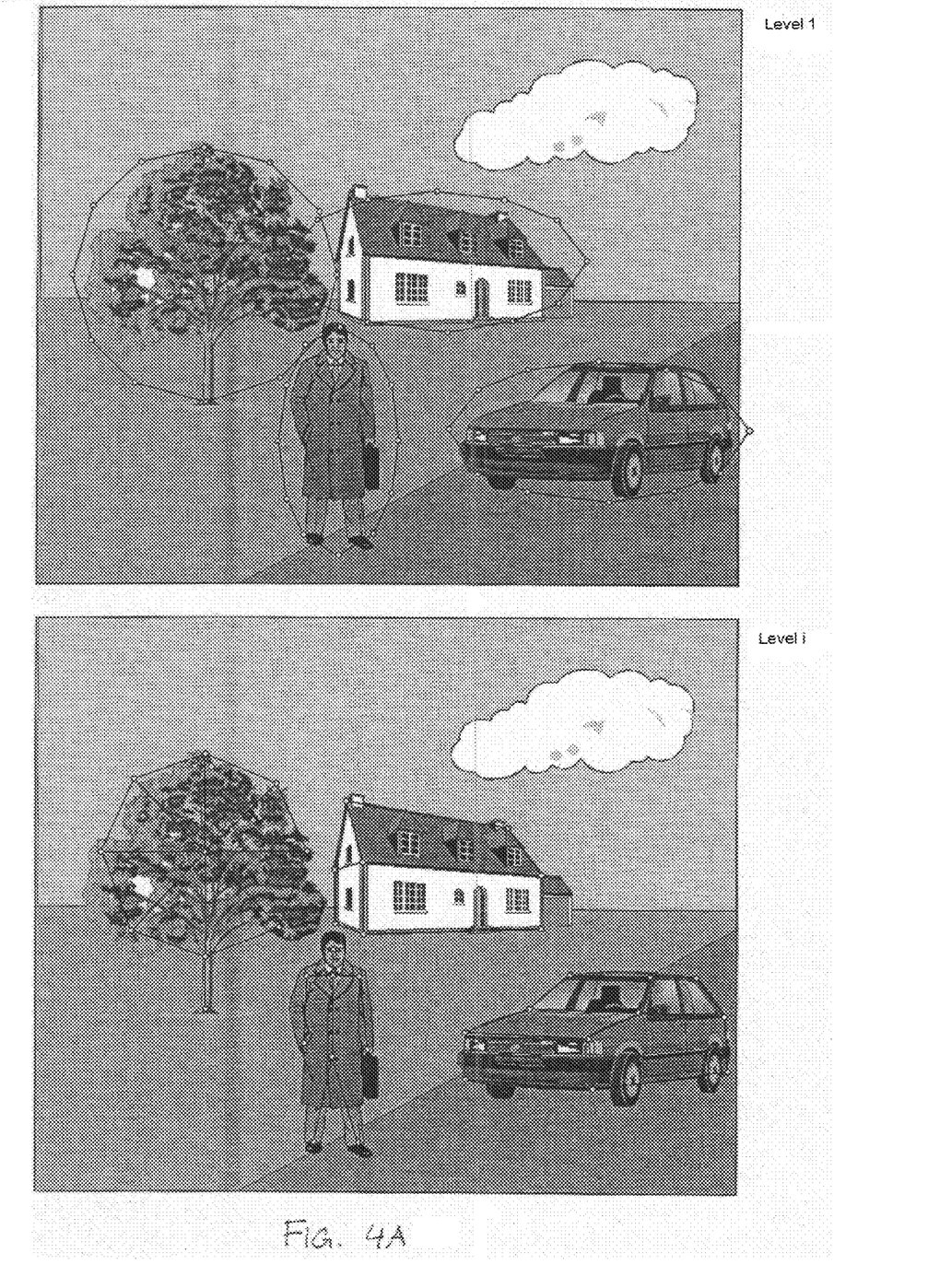

FIGS. 4A/4B show a picture analysis which was carried out on a complex scene with the picture matching models illustrated in FIGS. 3A/3B.

As the upper partial picture of FIG. 4A shows, the evaluation process first processes the models 100, 200, 300 of the lowermost level 1 with the methods assigned to them. Here, the objects are classified according to their orientation or preferred direction and their rough position in the picture is determined. For the man shown in the upper partial picture of FIG. 4A, model 100 fits, for the tree model 200 fits and model 300 is the best both for the car and also for the house. With the decision for a node, the method favours initially objects of the appropriate size and coarse structure of the models of this node.

Figure 4B:
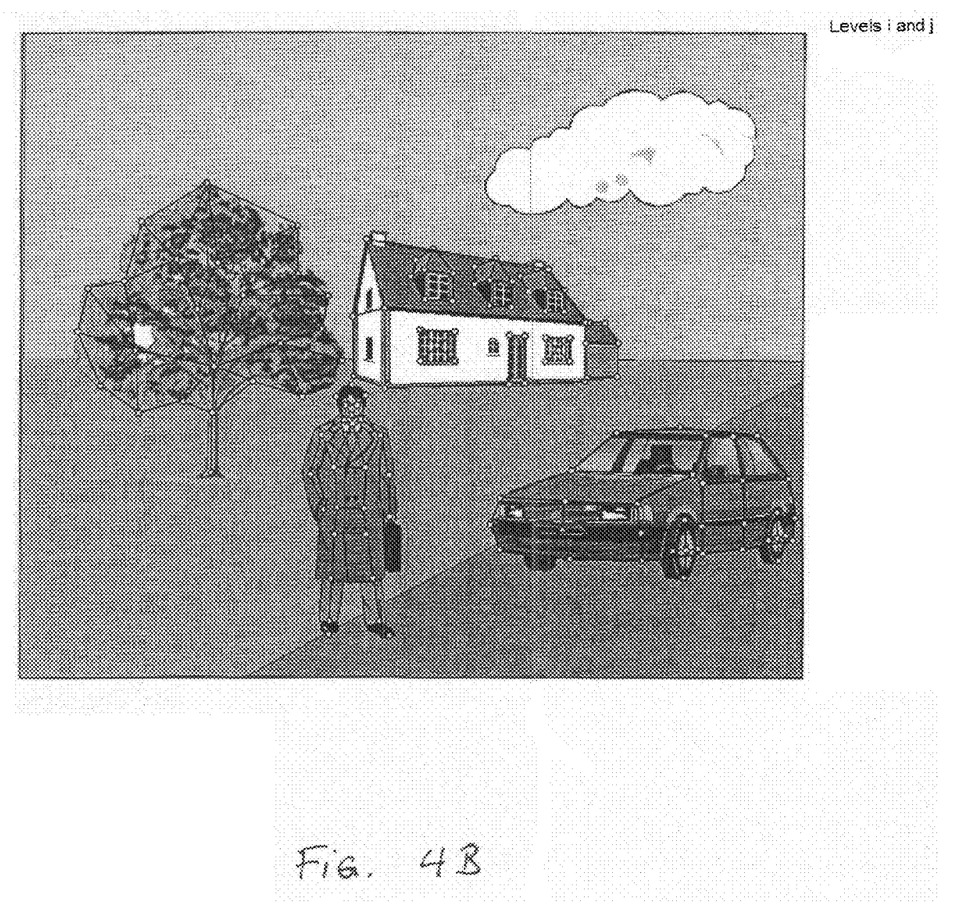

Further evaluation occurs again through the processing of the models of all son nodes with the method assigned to them. The selection of the next node occurs again from the nodes at which the previously assessed paths terminate. The evaluation however does not terminate with the determination of the first complete path, i.e. a path leading to an end node, but rather is continued until the assessment of the remaining paths appears to be uninteresting with regard to further evaluation. The result of this evaluation therefore consists of a set of complete paths through the structure graph, whereby each complete path belongs to an object in the picture. The set of these paths therefore corresponds to a description of the picture as a set of objects and their arrangement.

The invention claimed is:

1. A method of using a computing device to process digitised picture data by matching of picture matching models, comprising:
   (i) provision of an hierarchical structure graph comprising:
      nodes, wherein each node represents at least one parameterised picture matching model,
      a specified number of levels, arranged one above the other, whereby at least one node is located in each level,
      edges connecting pairs of predetermined nodes of different levels and defining, for each pair of nodes, a father node as the node in the lower level and a son node as the node in the upper level;
   (ii) application of the structure graph to the picture data in that, starting with the lowermost level, at least one node is processed,
      wherein the processing of a node comprises using the computing device to perform the steps of:
         matching of its at least one picture matching model to the picture data by variation of the model parameters,
         determination of a matching quantity for each parameter variation as a measure of the quality of the picture match, and
         determination of an assessment for each parameter variation, taking into account the at least one determined matching quantity, and
      wherein the assessment found for each parameter variation is applied as a criterion for the processing of a son node of the processed node and, if the criterion is fulfilled, the processing of the son node starts with the initialisation of its at least one matching model through predetermined parameters of the father node, wherein the picture matching models comprise graphs of features which are the result of the application of predetermined filters on reference picture data, wherein the features include jets, whereby the scaling of the filters from which the features are obtained becomes smaller from the lower levels to the upper levels in the structure graph, and wherein the matching quantity for the parameter variations is computed according to the formula $$S^{(n)} = f^{(n)}(P_k^{(n)} \underline{j}(k,m), P_k^{(n)} \underline{\tilde{j}}(k), \underline{d}^{(0)}(k,m), \underline{d}^{(n)}(k,m)), k \in K'(n) \subseteq K,$$

wherein:

$\underline{j}(k,m)$ is the jet of the picture matching model m on the node k, $\underline{\tilde{j}}(k)$ is the jet of the picture on the position of the node k, $\underline{d}^{(0)}(k,m)$ is the original position of the node k of the picture matching model m, $\underline{d}^{(n)}(k,m)$ is the position of the node k of the picture matching model m in step n, $f^{(n)}(\ldots)$ is a functional of the picture matching model jet and the picture jet at corresponding locations, $P_k^{(n)}$ represents an image of the jets $\underline{j}(k,m)$ or $\underline{\tilde{j}}(k)$, and $K'(n)$ is a subset of the set K of all graph nodes k.

2. A method according to claim 1, in particular for the recognition of at least one object of a given object class in a picture, whereby the structure graph includes precisely one node in each level, which at least represents one picture matching model and a lower threshold value and/or an upper threshold value is assigned to given nodes, whereby the method is terminated with the result, that no object of the given object class is recognised, if for a node the assessment of each parameter variation lies below the lower threshold value assigned to the node, or that at least one object of the given object class is recognised, if for a node the assessment of at least one parameter variation lies above the upper threshold value assigned to the node or if the end node is reached.

3. A method according to claim 1 for the recognition of the orientation and/or arrangement of elements of an object of an object class in a picture, in particular for estimating the pose, whereby the structure graph for each orientation to be recognised and/or arrangement of elements of the object exhibits at least one node with at least one picture matching model for the orientation to be recognised and/or arrangement of the elements of the object, and an upper and/or lower threshold value for the assessment of the parameter variations is assigned to given nodes, whereby the processing of son nodes of those processed nodes is waived for which the assessment of each parameter variation lies below the lower threshold value assigned to the relevant node with the result that the corresponding orientations and/or arrangements of the elements of the object are not present in the picture, whereby son nodes of those processed nodes are processed for which the assessment of at least one parameter variation lies between the upper and lower threshold values assigned to the node, and whereby processing of son nodes for the parameter variations is waived whose assessment lies above the upper threshold value assigned to the relevant node with the result that the orientation and/or arrangement of the elements of the object is classified as being present in the picture which receives the best assessment on the highest fully processed level.

4. A method according to claim 1 for scene analysis through the recognition of objects of different object classes and the arrangement of the objects in a picture:

whereby the structure graph for each object class exhibits at least one node with at least one picture matching model for the object class and a lower and/or upper threshold value is assigned to given nodes for the assessment of the parameter variations, whereby the processing of son nodes of those processed nodes is waived for which the assessment of each parameter variation lies below the lower threshold value assigned to the relevant node with the result that the associated object is classified as not being present in the picture, whereby son nodes of those processed nodes are processed for which the assessment of at least one parameter variation lies between the lower and upper threshold values assigned to the relevant nodes, and whereby the processing of son nodes for the parameter variations is waived whose assessment lies above the upper threshold value assigned to the relevant node with the result that the associated object is classified as being present in the picture.

5. A method according to claim 1, in which a lower threshold value is assigned to each node of the structure graph and the processing of son nodes of a node is waived if each parameter variation produces an assessment below the lower threshold value assigned to the node.

6. A method according to claim 1, in which a lower and/or an upper threshold value for given nodes is dynamically adaptable.

7. A method according to claim 1, whereby, at least partially, parameters of the processed father nodes are accepted for the processing of given nodes.

8. A method according to claim 1, whereby the assessment of the father node is taken into account for the assessment of given nodes.

9. A method according to claim 1, in which weightings, which are included in the assessment, are assigned to each picture matching model and/or each edge.

10. A method according to claim 1, in which the picture matching models of the nodes of the uppermost level are based on digitised reference picture data and/or the picture matching models of predetermined nodes are based on the picture matching models of their son nodes.

11. A method according to claim 1, in which the features comprise combinations of various types of jet.

12. A method according to claim 4 for picture compression and picture sequence compression, comprising the steps:

compressing each recognised object with a compression factor specified for the corresponding object class, whereby the control of the parameters of the compression method is based on the parameters of the results of the scene analysis, and compressing the picture region not occupied by objects using a higher specified compression factor.

13. A method of decompressing a picture which has been compressed according to the method described in claim 12.

14. A method of substituting at least one selected object by an object representative, in particular by an avatar, comprising the steps:

recognizing the at least one selected object according to the method of claim 2, providing reference pictures of the object representatives, substituting the at least one selected recognised object by the object representative, whereby part of the parameters of the picture matching models may be used for the control of the object representative.

15. A method of substituting a picture background by an alternate background, comprising the steps:
providing at least one reference picture for the alternate background,
recognizing at least one object according to the method of claim 2, and
positioning of the recognized at least one object in the reference picture.

16. A method, comprising:
(i) recognizing at least one selected recognised object according to the method of claim 2,
(ii) substituting the at least one selected object by an object representative, in particular by an avatar, comprising the steps:
providing reference pictures of the object representatives,
substituting the at least one selected recognised object by the object representative, whereby part of the parameters of the picture matching models may be used for the control of the object representative; and
(iii) substituting a picture background by an alternate background, comprising the steps:
providing at least one reference picture for the alternate background,
positioning the at least one selected recognised object in the reference picture;
whereby at least one selected recognised object is substituted by an object representative and the background is substituted by the alternate background.

17. A method of visually displaying scenes processed according to claim 14, comprising the steps:
providing a data base with the object representatives and/or the reference pictures for the background.

18. A method according to claim 17, in which the object representatives comprise real objects and/or virtual objects.

19. A method according to claim 1, whereby, for the processing of individual pictures in a picture sequence, the parameters of the picture matching models are assigned initial values which use part of the parameters from the processing of previous pictures.

20. A method according to claim 19, whereby the possible variations of the parameters of the picture matching models, based on a part of the parameters from the processing of previous pictures, are restricted.

21. A method according to claim 1, in which the features comprise combinations of various types of jet.

22. A method according to claim 1, wherein the application of predetermined filters on reference picture data includes a transformation of the reference picture data.

* * * * *